United States Patent
Kim et al.

(10) Patent No.: US 8,700,684 B2
(45) Date of Patent: Apr. 15, 2014

(54) APPARATUS AND METHOD FOR MANAGING A FILE IN A DISTRIBUTED STORAGE SYSTEM

(75) Inventors: Kyung-Soo Kim, Gwangju-si (KR); Jae-Beom Cheon, Suwon-si (KR); Joo-Hyun Kim, Seoul (KR); Bong-Sik Sihn, Gwangju-si (KR); Bong-Joo Jin, Chungju-si (KR); Hyoung-Choul Kim, Anyang-si (KR); Young-Gyu Kim, Seongnam-si (KR); Sun Choi, Seongnam-si (KR); Gu-Yong Lee, Seoul (KR)

(73) Assignee: PSpace Inc., Seongnam-si (KR)

( * ) Notice: Subject to any disclaimer, the term of this patent is extended or adjusted under 35 U.S.C. 154(b) by 2 days.

(21) Appl. No.: 13/500,027

(22) PCT Filed: Nov. 3, 2010

(86) PCT No.: PCT/KR2010/007721
§ 371 (c)(1),
(2), (4) Date: Apr. 3, 2012

(87) PCT Pub. No.: WO2011/055976
PCT Pub. Date: May 12, 2011

(65) Prior Publication Data
US 2012/0203809 A1     Aug. 9, 2012

(30) Foreign Application Priority Data

Nov. 3, 2009   (KR) .................. 10-2009-0105661
Nov. 3, 2009   (KR) .................. 10-2009 0105663

(51) Int. Cl.
*G06F 17/30* (2006.01)

(52) U.S. Cl.
USPC ........................................ 707/827

(58) Field of Classification Search
USPC ........................................ 707/827
See application file for complete search history.

(56) References Cited

U.S. PATENT DOCUMENTS

| | | | |
|---|---|---|---|
| 7,318,110 B2 | 1/2008 | Yumoto et al. | |
| 2005/0125456 A1 | 6/2005 | Hara et al. | |
| 2007/0088226 A1* | 4/2007 | Spence et al. | 600/509 |
| 2008/0027905 A1* | 1/2008 | Jensen et al. | 707/2 |
| 2009/0106518 A1* | 4/2009 | Dow | 711/165 |

FOREIGN PATENT DOCUMENTS

| | | |
|---|---|---|
| JP | 2001-256084 A | 9/2001 |
| JP | 2004-005092 A | 1/2004 |
| JP | 2005-196725 A | 7/2005 |

* cited by examiner

*Primary Examiner* — Rehana Perveen
*Assistant Examiner* — Alexander Khong
(74) *Attorney, Agent, or Firm* — Sughrue Mion, PLLC (57) ABSTRACT

The present invention relates to an apparatus and method for managing files in a distributed storage system. The apparatus and method for managing a file in a distributed storage system according to the present invention counts the number of inquiries on a file requested by a client; selects the file as a hot file if the number of inquiries counted in a certain counting period is larger than a hot file selection threshold value; and increases the number of copies of the file selected as a hot file or stores the file selected as a hot file in a storage device having a relatively good performance.

30 Claims, 10 Drawing Sheets

APPARATUS AND METHOD FOR MANAGING A FILE IN A DISTRIBUTED STORAGE SYSTEM

CROSS REFERENCE TO PRIOR APPLICATIONS

This application is a National Stage Patent Application of PCT International Patent Application No. PCT/KR2010/007721 (filed on Nov. 3, 2010) under 35 U.S.C. §371, which claims priority to Korean Patent Application Nos. 10-2009-0105661 (filed on Nov. 3, 2009) and 10-2009-0105663 (filed on Nov. 3, 2009), which are all hereby incorporated by reference in their entirety.

TECHNICAL FIELD

The present invention relates to an apparatus and method for managing files in a distributed storage system (DSS), and more specifically, to an apparatus and method for efficiently managing files in a distributed storage system by selecting hot files frequently inquired by clients and separately managing the hot files from general files.

BACKGROUND ART

A distributed storage system or a parallel storage system is a storage system which virtualizes a plurality of storage devices as one storage device. Such a distributed storage system does not store one file in one storage device, but the file is duplicated, stored and used in a plurality of virtualized storage devices in a distributed manner.

As an existing Redundant Array of Inexpensive Devices (RAID) storage device integrates a plurality of hard disks into one storage device to construct a further larger, further faster and further stable storage device, the distributed storage system may provide functions of a further larger, further faster and further stable storage system by configuring a plurality of storage devices into one storage device.

Such a distributed storage system technique is used as a core technique in cloud computing or the like, and if the number of storage devices configuring the distributed storage system increases further more, capacity and performance of the distributed storage system are proportionally enhanced, and cost-effectiveness of the Total Cost of Owner-ship is maximized. Therefore, the distributed storage system may provide high-level performance and expandability which cannot be provided by existing storage systems.

Figure 1:
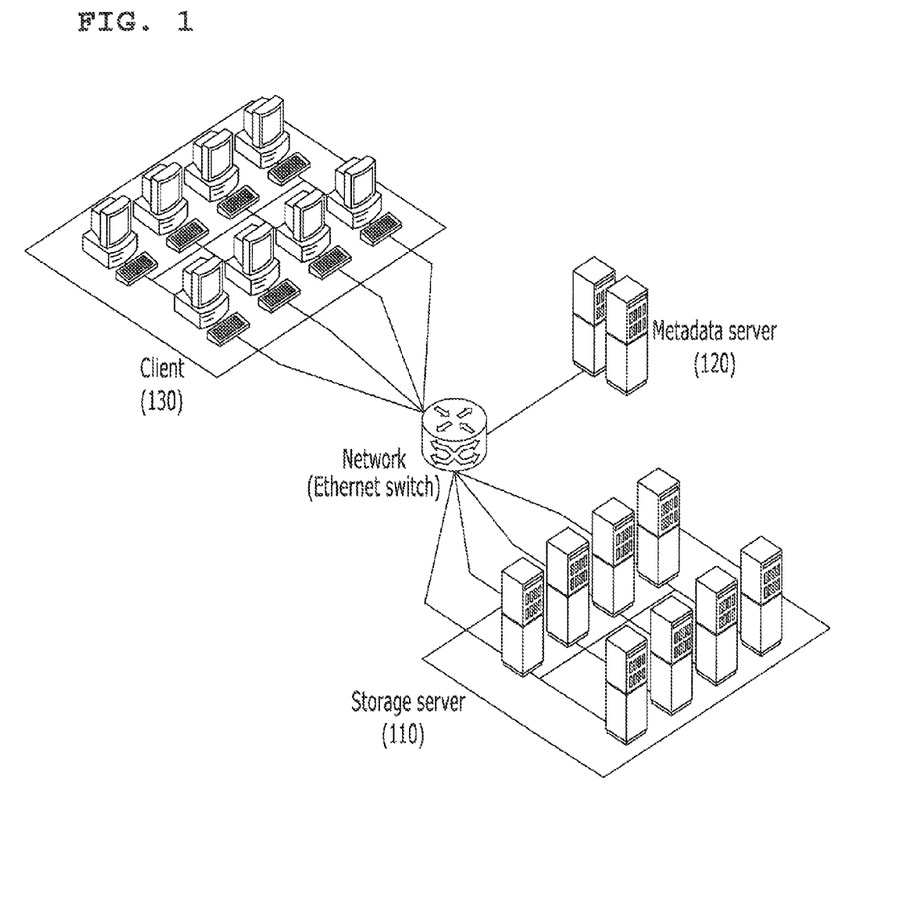
FIG. 1 is a view showing the configuration of a distributed storage system according to a conventional technique.

In relation to this, FIG. 1 is a view showing the configuration of a distributed storage system according to a conventional technique.

Referring to FIG. 1, a distributed storage system generally includes a plurality of storage servers (this corresponds to one virtual storage server) 110 for duplicating and storing a file in a distributed manner, and a metadata server 120 for creating and managing metadata of the file. If at least a client 130 requests input or output of a certain file through a network or the like, the metadata server 120 provides information on the storage servers 110 in which a corresponding file will be or is stored in a distributed manner. Then, the client 130 connects to the storage servers 110 and inputs or outputs the corresponding file, and thus the service is provided. (For reference, in the present invention, the terminology 'file' means contents inquired or requested by the client, including a file, data, contents, a chunk or the like).

However, since the distributed storage system according to a conventional technique manages the files stored in the storage servers based on a standardized rule (i.e., manages by applying the same standard), if the client frequently inquires a specific file, bottlenecks to the file are produced, and thus performance and efficiency of the system are degraded.

That is, the conventional techniques do not separately manage frequently inquired files, and thus when a specific file is frequently inquired, bottlenecks are produced since the number of files distributed in the storage devices is relatively small. Therefore, the whole performance and efficiency of the system are degraded.

Figure 2:
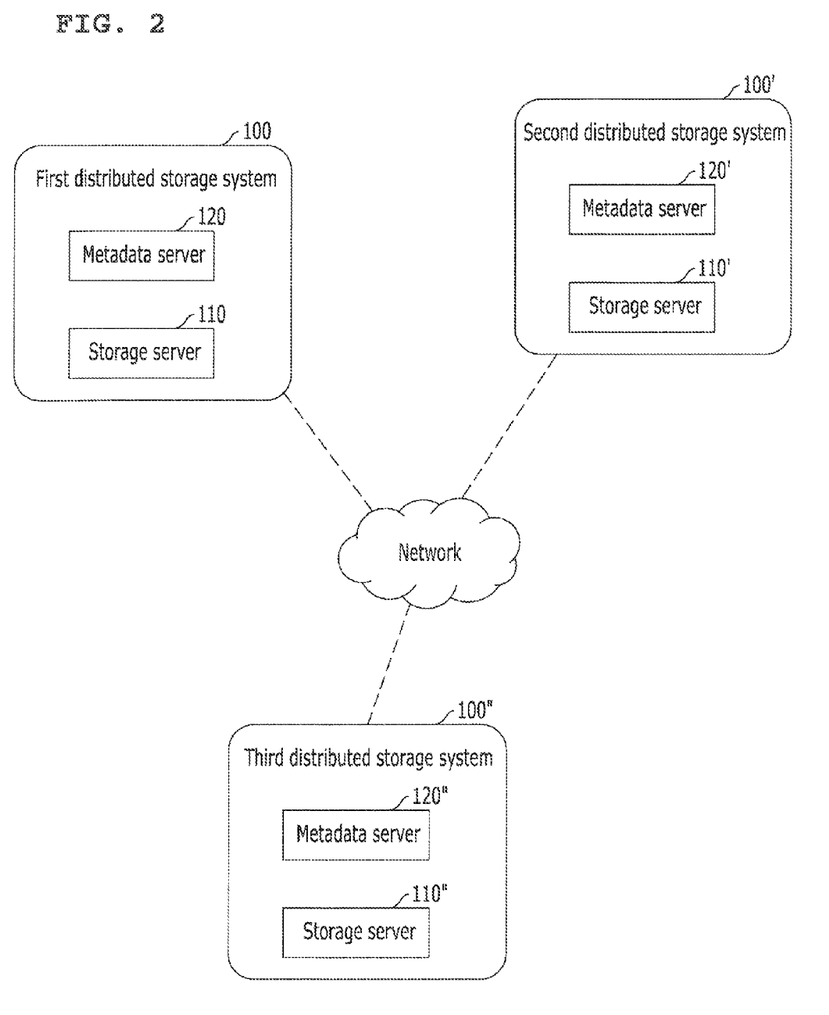

Meanwhile, a plurality of interrelated distributed storage systems can be interconnected through a network or the like, and FIG. 2 is a view describing the interrelated distributed storage systems, which shows the structure of a plurality of distributed storage systems interconnected through a network or the like.

Referring to FIG. 2, a first distributed storage system 100 includes a plurality of storage servers 110 for storing a file in a distributed manner and a metadata server 120 for managing metadata of the file. In the same manner, a second and a third distributed storage systems 100' and 100" also respectively include a plurality of storage servers 110' and 110" and a metadata server 120' and 120", and the distributed storage systems are closely interconnected through a network or the like and share the files (data or contents).

Like this, when several distributed storage systems are closely interconnected and share the files, conventional techniques generally operate the interconnected distributed storage systems in two methods. First, all the files are synchronized with one another, and each of the distributed storage systems possesses the identical file. Second, each of the distributed storage systems possesses an original file and responds to a request of inquiry by transmitting a corresponding file if the other storage systems request inquiry of the file.

However, in the case of the first method, since all the files should be synchronized with one another in the interconnected distributed storage systems, the files are frequently moved, and a large storage space is required. Particularly, since certain distributed storage systems should store even the files that are almost not requested, storage space and communication bandwidths are greatly wasted.

In addition, in the case of the second method, waste of storage space can be reduced since files are actually moved only when inquiry of a corresponding file is requested. However, in the case of a hot file frequently inquired by clients, the file may be requested from a plurality of distributed storage systems at the same time, and thus bottlenecks are produced. Therefore, response speed is slowed down, and thus performance and efficiency of the system are degraded.

DISCLOSURE OF INVENTION

Technical Problem

Therefore, the present invention has been made in view of the above problems, and it is an object of the present invention to provide an apparatus and method for managing files, in which performance and efficiency of a system are improved by separately managing the files frequently inquired by clients in a distributed storage system.

Another object of the present invention is to provide an apparatus and method for managing files, in which interconnected distributed storage systems are efficiently operated by copying the files frequently inquired by clients in a certain distributed storage system into at least one of the other distributed storage systems and synchronizing the files.

Still another object of the present invention is to provide an apparatus and method for managing files, in which network loads concentrated on hot files frequently inquired by clients in a distributed storage system are mitigated by increasing the number of copies of the hot files or storing the hot files in a high-performance storage medium (e.g., SSD or cache memory), and thus system performance is improved, Still another object of the present invention is to provide an apparatus and method for managing files, in which the files are efficiently managed by adaptively selecting hot files considering the current number of hot files, the number of copies of the hot files, performance and extra storage space of a storage device, and the like in a distributed storage system.

Still another object of the present invention is to provide an apparatus and method for managing files, in which a length of a session is set to a value obtained by dividing a inquiry counting period by an exponentiation of two in the process of selecting a hot file, and the hot file is determined using a session access flag of a corresponding session, and thus the amount of operation and usage of memory required for selecting the hot file are reduced.

Still another object of the present invention is to provide an apparatus and method for managing files, in which if a file is determined as a hot file once, the hot file status is forcibly maintained for a certain period of time and/or until the number of inquiries is dropped below a certain threshold value, and thus further efficient hot file management policies can be implemented by preventing degradation of system performance caused by frequent changes in the hot file status.

Still another object of the present invention is to provide a distributed storage system which efficiently uses the file management apparatus and method described above.

Technical Solution

To accomplish the above objects, according to one aspect of the present invention, there is provided a file management apparatus of a distributed storage system, the apparatus including: an inquiry frequency counting unit for counting the number of inquiries on a file requested by a client; a hot file selection unit for determining whether or not to select the file as a hot file based on the number of inquiries counted on the file; and a hot file management unit for managing the file selected as a hot file to be separated from files that are not selected as a hot file.

According to an aspect of the present invention, there is provided a distributed storage system including: a plurality of storage servers for storing a file in a distributed manner; and a metadata server for managing metadata of the file, in which the metadata server counts the number of inquiries on a file requested by a client, determines whether or not to select the file as a hot file, and increases the number of copies of the file selected as a hot file or stores the file selected as a hot file in a storage device having a relatively good performance.

According to an aspect of the present invention, there is provided a file management method of a distributed storage system, the method including the steps of: counting the number of inquiries on a file requested by a client; selecting the file as a hot file if the number of inquiries counted in a certain counting period is larger than a hot file selection threshold value; and increasing the number of copies of the file selected as a hot file or storing the file selected as a hot file in a storage device having a relatively good performance.

To accomplish the above objects, according to another aspect of the present invention, there is provided a file management apparatus of a distributed storage system, the apparatus including: an inquiry frequency counting unit for counting the number of inquiries on a file requested by a client; a hot file selection unit for determining whether or not to select the file as a hot file based on the number of inquiries counted on the file; and a hot file synchronization unit for copying the file selected as a hot file into at least one of the other distributed storage systems and synchronizing the file.

According to another aspect of the present invention, there is provided a distributed storage system comprising: a plurality of storage servers for storing a file in a distributed manner; and a metadata server for managing metadata of the file, in which the metadata server counts the number of inquiries on a file requested by a client, determines whether or not to select the file as a hot file, and copies the file selected as a hot file into at least one of the other distributed storage systems and synchronizes the file.

According to another aspect of the present invention, there is provided a file management method of a distributed storage system, the method including the steps of: counting the number of inquiries on a file requested by a client; selecting the file as a hot file if the number of inquiries counted in a certain counting period is larger than a hot file selection threshold value; and copying the file selected as a hot file into at least one of the other distributed storage systems and synchronizing the file.

Advantageous Effects

According to the present invention, file management can be efficiently performed by reducing network loads caused by specific files frequently inquired in a distributed storage system and improving accessibility to popular files.

In addition, according to the present invention, management of hot files in a distributed storage system is performed at the file system level, and limitations of the existing file management limited only to an application level are overcome, and thus system performance can be improved.

In addition, according to the present invention, the functions of a cache storage can be accomplished for the inquiries expected in the future by previously copying hot files frequently inquired by clients in a certain distributed storage system into at least one of the other distributed storage systems and synchronizing the file.

In addition, according to the present invention, files are efficiently managed by adaptively selecting hot files considering the current number of hot files, the number of copies of the hot files, performance and extra storage space of a storage device, and the like in a distributed storage system.

In addition, according to the present invention, a length of a session is set to a value obtained by dividing a inquiry counting period by an exponentiation of two in the process of selecting a hot file, and the hot file is determined using a session access flag of a corresponding session, and thus the hot file can be efficiently managed using a relatively small amount of operation and usage of memory.

BRIEF DESCRIPTION OF THE DRAWINGS

FIG. 2 is a view showing the structure of a plurality of distributed storage systems interconnected through a network or the like.

BEST MODE FOR CARRYING OUT THE INVENTION

The preferred embodiments of the present invention will be hereafter described in detail, with reference to the accompanying drawings. Furthermore, in the drawings illustrating the embodiments of the present invention, elements having like functions will be denoted by like reference numerals and details thereon will not be repeated.

Figure 3:
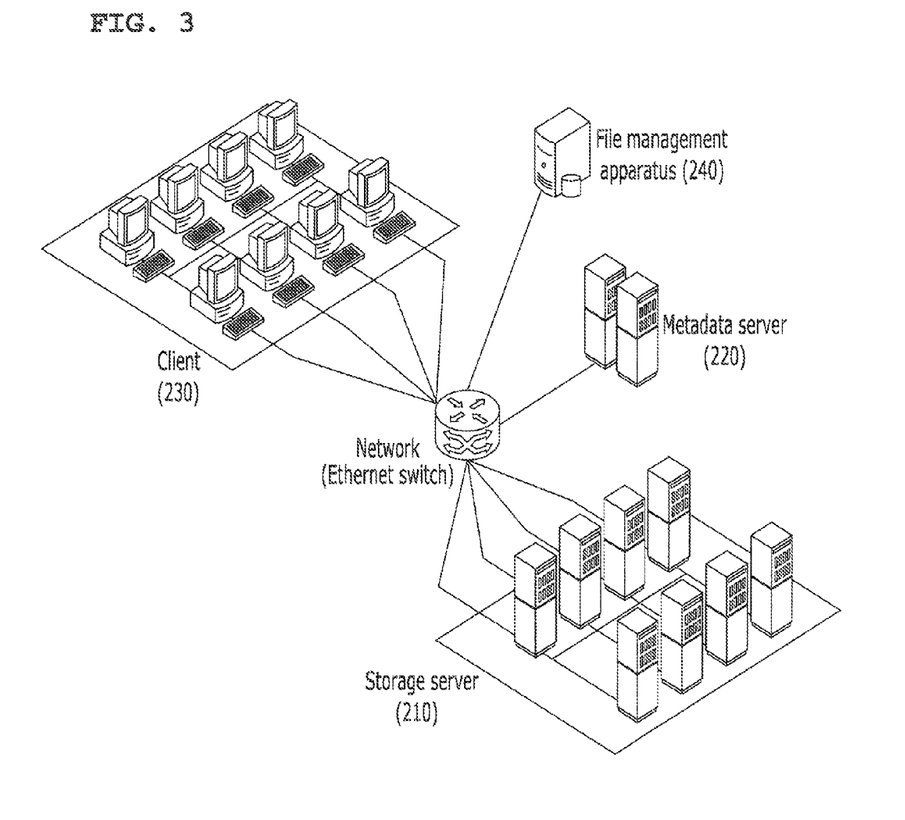
FIG. 3 is a view showing the configuration of a distributed storage system according to an embodiment of the present invention.

First, FIG. 3 is a view showing the configuration of a distributed storage system according to an embodiment of the present invention as an example.

Referring to FIG. 3, a distributed storage system according to an embodiment of the present invention includes a plurality of storage servers 210 for duplicating and storing a file in a distributed manner, a metadata server 220 for creating and managing metadata of the file, and a file management apparatus 240 for selecting and managing hot files among the files. The file management apparatus 240 increases the number of copies of a file selected as a hot file by the unit of file or chunk or stores the file selected as a hot file in a storage device having a relatively good performance. Therefore, although the file is frequently requested (inquired) by clients 230, the file management apparatus 240 efficiently processes the requests and improves system performance.

Figure 4:
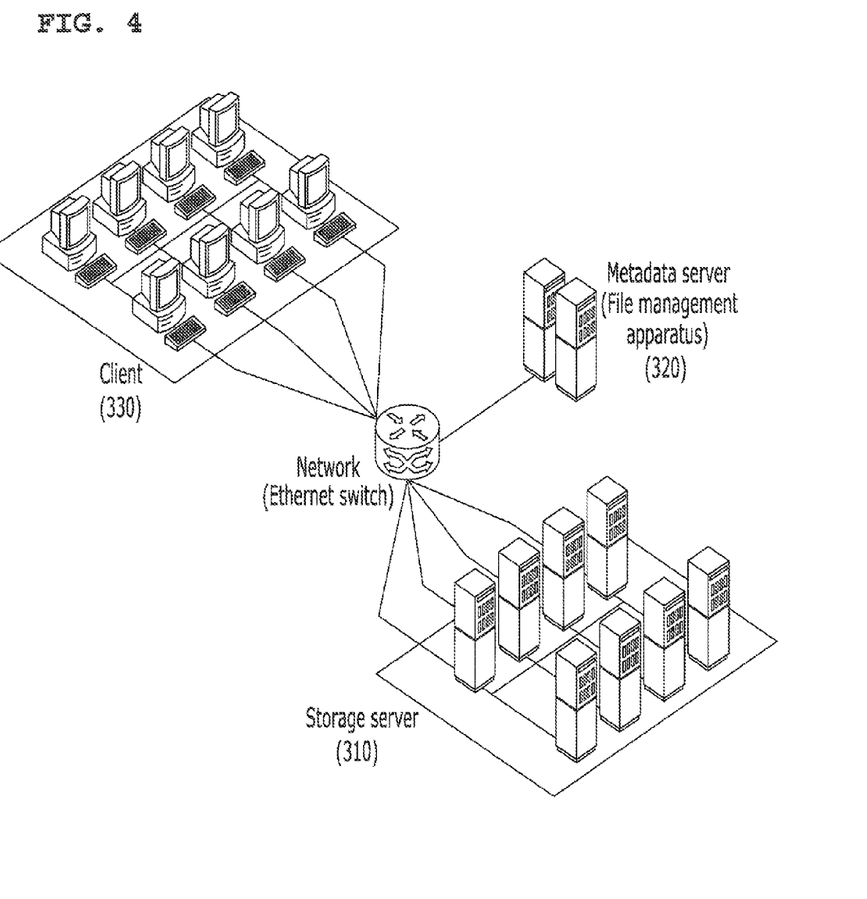
FIG. 4 is a view showing the configuration of a distributed storage system according to another embodiment of the present invention.

Meanwhile, FIG. 4 is a view showing the configuration of a distributed storage system according to another embodiment of the present invention.

Referring to FIG. 4, a distributed storage system according to another embodiment of the present invention includes a plurality of storage servers 310 for duplicating and storing a file in a distributed manner, and a metadata server 320 for creating and managing metadata of the file. Particularly, since the metadata server 320 includes the functions of the file management apparatus according to the present invention, the metadata server 320 selects a frequently inquired file as a hot file, and increases the number of copies of the file selected as a hot file or stores the file selected as a hot file in a storage device having a relatively good performance. Therefore, although the file is frequently requested (inquired) by clients 330, the metadata server 320 efficiently processes the requests.

Describing additionally, the file management apparatus according to the present invention is configured as a separate apparatus or server in a distributed storage system (refer to FIG. 3) or configured as a metadata server itself or a part thereof (refer to FIG. 4), and reduces system loads and improves system performance by selecting and separately managing hot files that are frequently inquired by the clients.

Figure 5:
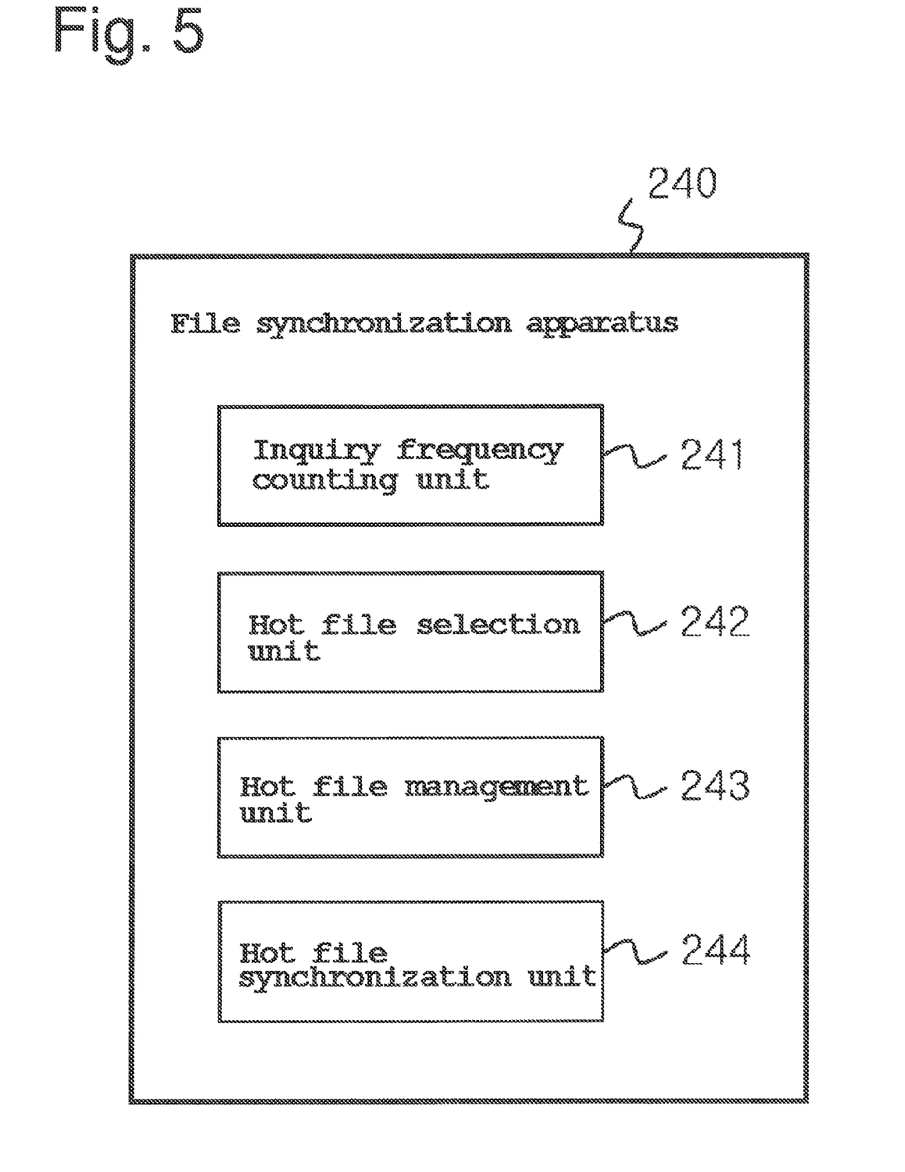
FIG. 5 is a view showing the detailed configuration of a file management apparatus according to an embodiment of the present invention.

In relation to this, FIG. 5 is a view showing the detailed configuration of a file management apparatus according to an embodiment of the present invention. As shown in the figure, a file management apparatus 240 according to an embodiment of the present invention includes an inquiry frequency counting unit 241, a hot file selection unit 242, a hot file management unit 243, and a hot file synchronization unit 244, and particularly, the file management apparatus 240 can be advantageously applied to the distributed storage system shown in FIG. 3.

Figure 6:
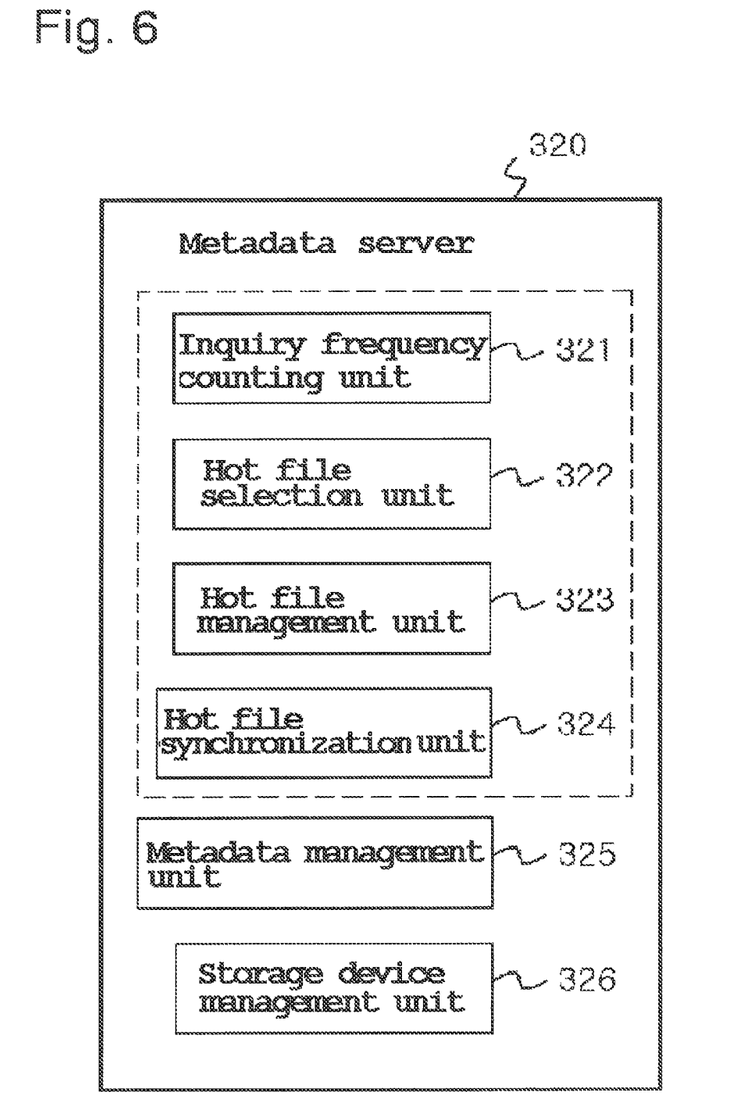
FIG. 6 is a view showing the detailed configuration of a file management apparatus according to another embodiment of the present invention.

Then, FIG. 6 is a view showing the detailed configuration of a file management apparatus 320 according to another embodiment of the present invention. As shown in the figure, a file management apparatus 320 according to another embodiment of the present invention includes an inquiry frequency counting unit 321, a hot file selection unit 322, a hot file management unit 323, a hot file synchronization unit 324, a metadata management unit 325, and a storage device management unit 326, and particularly, the file management apparatus 320 can be advantageously applied to the distributed storage system shown in FIG. 4.

Figure 7:
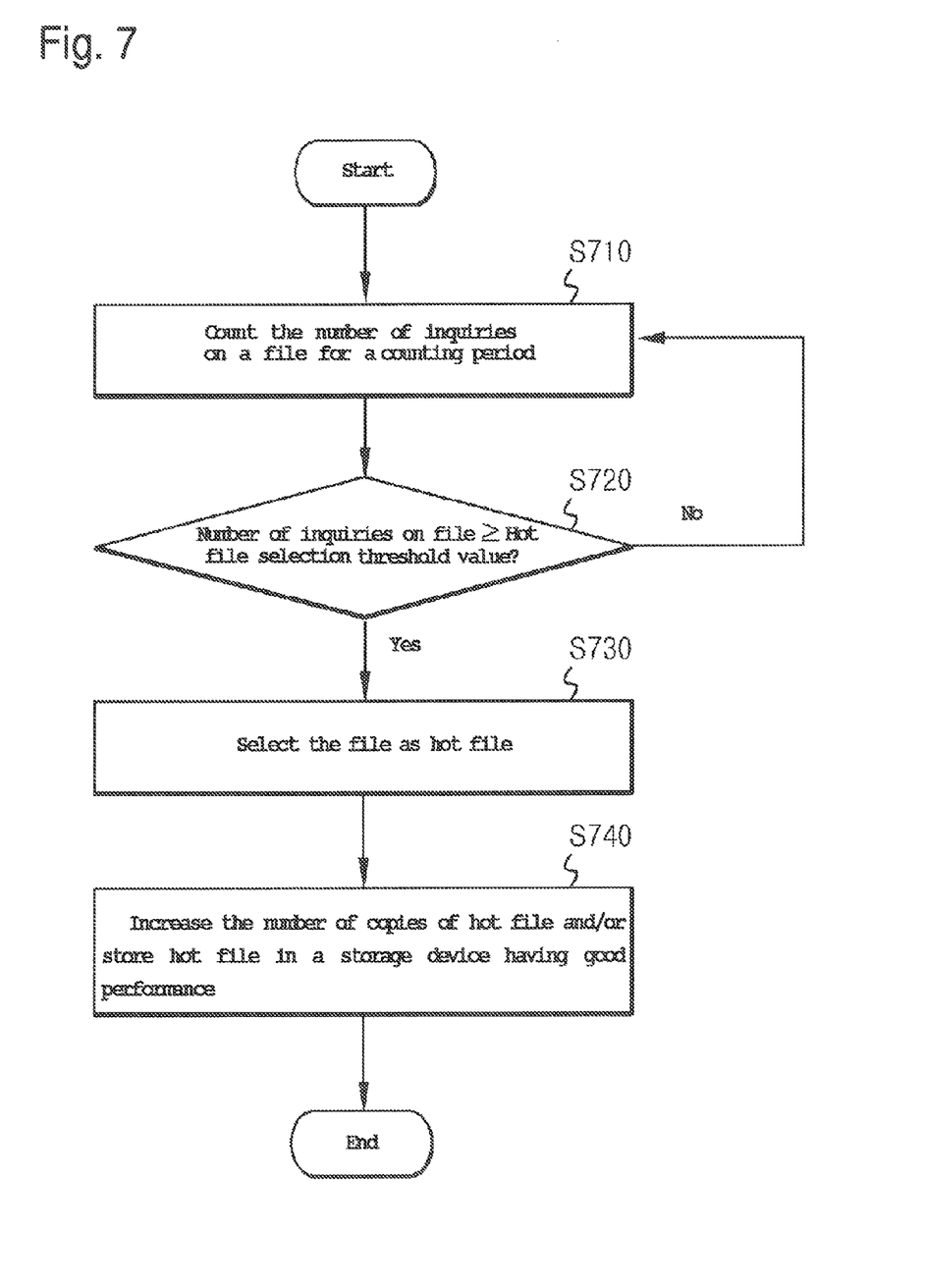
FIG. 7 is a flowchart illustrating a file management method according to an embodiment of the present invention.

Meanwhile, FIG. 7 is a flowchart illustrating a file management method in a distributed storage system according to an embodiment of the present invention. Specifically, a hot file is selected by counting the number of inquiries on a file in a certain counting period, and the hot file is separately managed by increasing the number of copies of the hot file or storing the hot file in a storage device having a relatively good performance.

Figure 8:
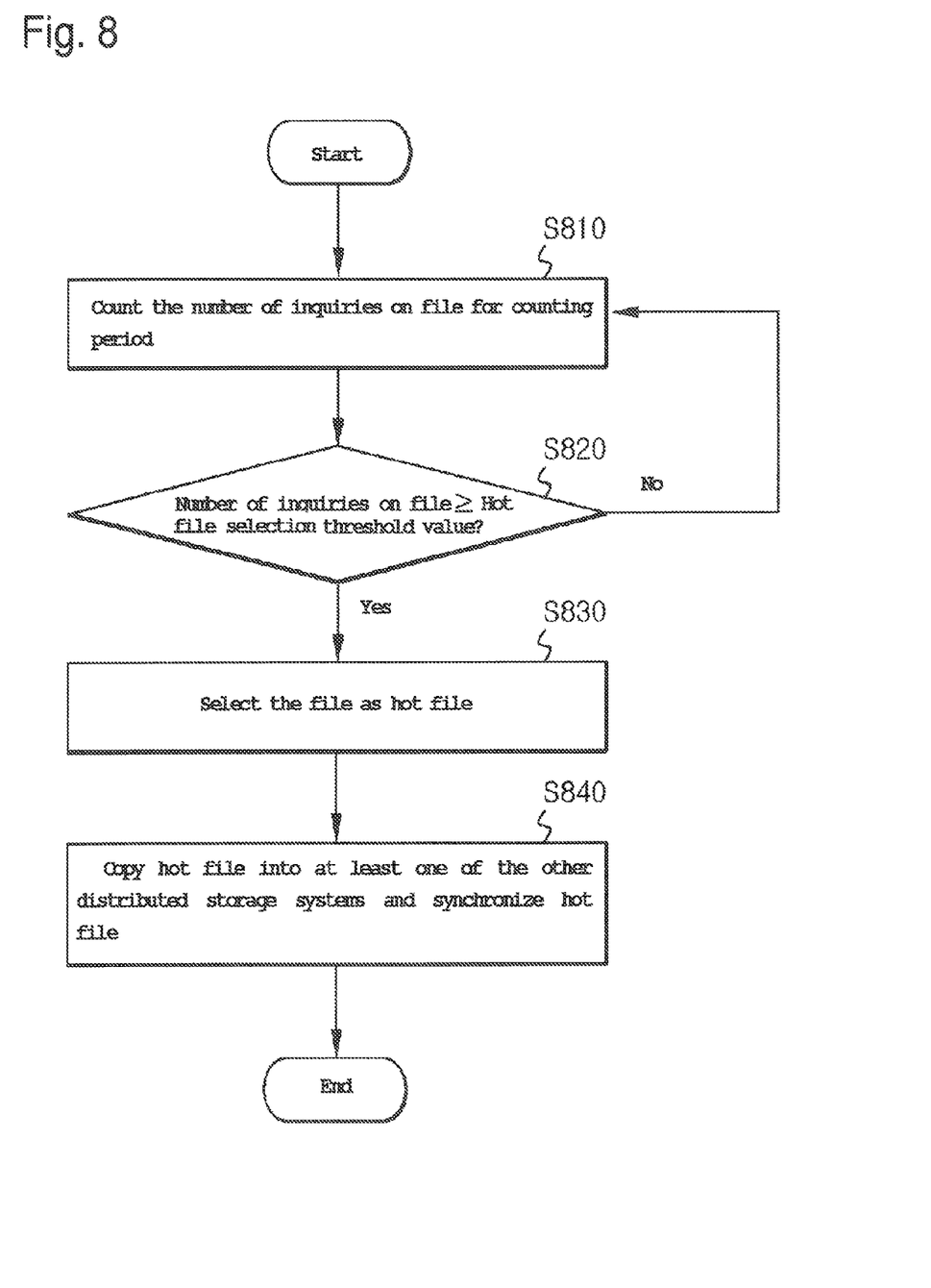
FIG. 8 is a flowchart illustrating a file management method according to another embodiment of the present invention.

Then, FIG. 8 is a flowchart illustrating a file management method in a distributed storage system according to another embodiment of the present invention. Specifically, a hot file is selected by counting the number of inquiries on a file in a certain counting period, and the hot file is separately managed by copying the hot file into at least one of the other distributed storage systems and synchronizing the file.

Hereinafter, a file management apparatus and method in a distributed storage system according to the present invention will be described in detail with reference to FIGS. 2 to 10. For reference, practically the same or similar configurations and functions will be described equally without discrimination although embodiments of the present invention are slightly different.

First, referring to FIGS. 5 and 6, the inquiry frequency counting unit 241 and 321 of the file management apparatus according to the present invention counts the number of inquiries on a corresponding file requested by clients for a predetermined inquiry counting period (refer to S710 of FIGS. 7 and S810 of FIG. 8).

In this case, the inquiry frequency counting unit 241 and 321 preferably counts the number of inquiries at regular intervals, And a certain unit period for counting the number of inquiries at regular intervals is referred to as a session. In addition, the counting period is preferably implemented in a length corresponding to positive integer times of the session, and particularly, the counting period is further preferably implemented in a length corresponding to an exponentiation of two of the session ($2, 2^2, 2^3, 2^4, \ldots$). That is, if the length of the session is set to a value obtained by dividing the counting period by an exponentiation of two, the number of inquiries on a file can be updated only with shift operations, and thus it is possible to reduce the amount of operation and improve system performance.

Figure 9:
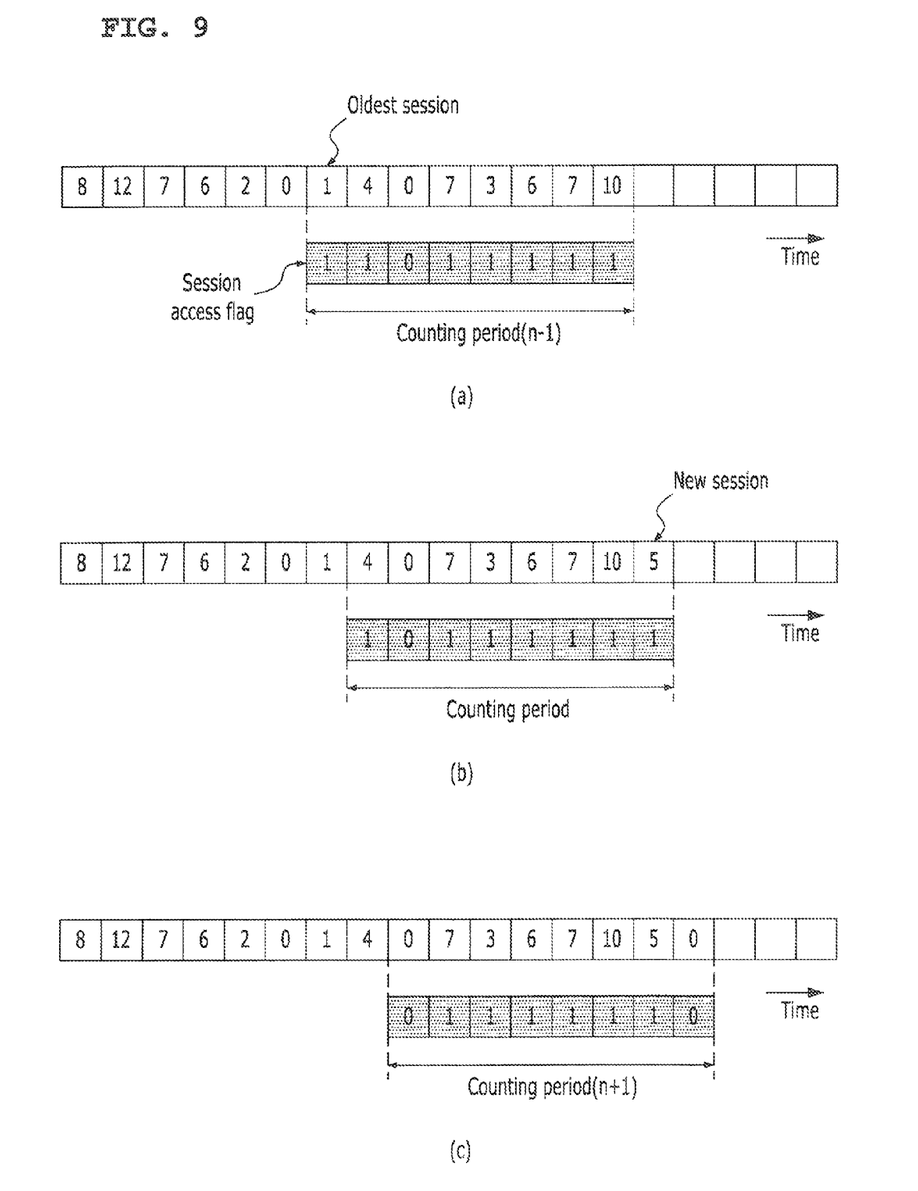
FIG. 9 is a view showing an example of a method of counting the number of inquiries using a session access flag according to the present invention.

In relation to this, FIG. 9 is a view showing an example of a method of counting the number of inquiries using a session access flag according to the present invention. For reference, the inquiry counting period is implemented in a length corresponding to $8(=2^3)$ sessions in this embodiment, and the session access flag indicates information on whether or not a file is inquired during a corresponding session.

Describing this in detail hereinafter, FIG. 9(a) shows a view counting the number of inquiries on a certain file in a previous (n−1-th) counting period, and in this case, the number of inquiries in the previous (n−1-th) counting period is 38[=1+4+0+7+3+6+7+10] calculated by adding all the number of inquiries in 8 sessions.

Then, FIG. 9(b) shows a view counting the number of inquiries on a certain file in a current (n-th) counting period, and in this case, the number of inquiries in the current (n-th) counting period is calculated by subtracting the number of inquiries [1] corresponding to the oldest session from the number of inquiries [38] counted in the previous (n−1-th) counting period and then adding the number of inquiries [5] counted in a new session, which becomes 42[=4+0+7+3+6+7+10+5].

Furthermore, FIG. 9(c) shows a view counting the number of inquiries on a certain file in a next (n+1-th) counting period, and in the same manner, in this case, the number of inquiries in the next (n+1-th) counting period will be 38[=0+7+3+6+7+10+5+0].

Meanwhile, although the inquiry frequency counting unit 241 and 321 may calculate the exact number of inquiries in a counting period using the method described above (a first method), if the memory is insufficient for example, usage of memory can be reduced by calculating the number of inquiries in a method described below (a second method) using a session access flag. That is, although the first method described above may calculate the exact number of inquiries in a counting period, the number of inquiries in all updated sections (sessions) corresponding to the counting period should be kept, and thus it is disadvantageous in that usage of memory is increased. Accordingly, the number of inquiries can be calculated in the second method described below when the memory is insufficient, and a user may appropriately implement selection of the first or second method depending on system performance.

Describing the second method using a session access flag in detail, in the case of FIG. 9(a), the inquiry frequency counting unit 241 and 321 stores the number of inquiries [38] in the previous (n−1-th) counting period and information on the session access flag [11011111] corresponding thereto. That is, in the second method, the number of inquiries is stored not for all the sessions corresponding to the counting period, but the total number of inquiries in the counting period and information on the session access flag are stored.

Then, in the case of FIG. 9(b), the number of inquiries in the current (n-th) counting period is calculated by subtracting the number of inquiries corresponding to the oldest session from the number of inquiries [38] in the previous (n−1-th) counting period and then adding the number of inquiries [5] in a new session, and in this case, since the number of inquiries corresponding to the oldest session does not remain in the memory, it is calculated as described below.

Specifically, the number of inquiries corresponding to the oldest session is obtained by dividing the total number of inquiries [38] counted in the previous counting period by the number of sessions [7] having a session access flag of 1 among the sessions corresponding to the previous counting period and then multiplying the value of the session access flag [1] of the oldest session. Accordingly, the number of inquiries corresponding to the oldest session becomes about 5.43[=(38/7)*1], and this is an average of the number of inquiries in the sessions whose session access flag is 1 (i.e., sessions where inquiry is requested at least once).

Then, the session access flag information is shifted by 1 when a value of the session access flag is created for a new session.

Therefore, the usage of memory and the amount of operation can be efficiently reduced by implementing the method of counting the number of inquiries in the second method. For example, the memory is used as much as 4×8=32 bytes in the first method (here, 4 is a size for storing the number of inquiries of a session, and 8 means 8 sessions), whereas only 1+4×2=9 bytes of memory is used in the second method (here, 1 is a size for storing the 8-bit session access flag, 4 is a size for storing the number of inquiries in a session, and 2 means the total and the current sessions), and thus the memory is saved as much as 23/32=71.9%.

For reference, in this case, an entry of a record in a corresponding file may be configured with a file name, a volume name, the number of inquiries in a counting period, the number of inquiries in a session, a session access flag and the like.

Referring to FIGS. 5 and 6 again, the hot file selection unit 242 and 322 of the file management apparatus according to the present invention determines whether or not to select a file as a hot file based on the number of inquiries on the file counted in a counting period as described above.

Specifically, the hot file selection unit 242 and 322 compares the number of inquiries on a file counted in a counting period with a predetermined hot file selection threshold value (refer to S720 of FIGS. 7 and S820 of FIG. 8), and if the number of inquiries on the file is larger than the hot file selection threshold value, the file is determined as a hot file (refer to S730 of FIGS. 7 and S830 of FIG. 8).

In addition, even after a certain file is selected as a hot file, the hot file selection unit 242 and 322 continuously manages the hot file. If the number of inquiries on the file is small, the hot file selection unit 242 and 322 restores the hot file to an ordinary file (releases the hot file status). For example, the hot file selection unit 242 and 322 compares the number of inquiries on a file counted in a counting period with a predetermined hot file release threshold value, and if the number of inquiries on the file is smaller than the hot file release threshold value, the hot file selection unit 242 and 322 releases the file from being a hot file. At this point, the hot file release threshold value is preferably set to a value smaller than the hot file selection threshold value in order to prevent frequent changes of the hot file status. In addition, it is preferable to set a minimum hot file status sustaining period to forcibly maintain the hot file status for a predetermined period of time after a file is selected as a hot file.

Figure 10:
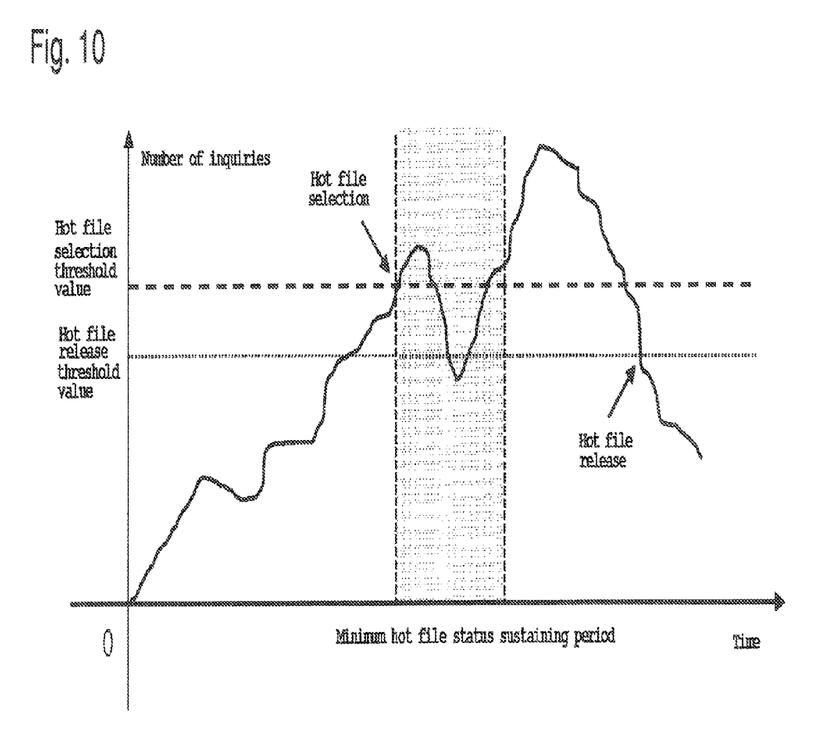
FIG. 10 is a graph showing the number of inquiries on a certain file with respect to time as an example.

FIG. 10 is a view for describing this, which is a graph showing changes in the number of inquiries on a certain file counted in a certain period, with respect to time.

Referring to FIG. 10, if the number of inquiries on a file increases and becomes larger than the hot file selection threshold value, the file is selected as a hot file, and after the file is selected as a hot file, the hot file status is maintained for a certain minimum hot file status sustaining period regardless of the number of inquiries (e.g., although the number of inquiries drops to be smaller than the hot file release threshold value). If the number of inquiries drops to be smaller than the hot file release threshold value after the minimum hot file status sustaining period is elapsed, the hot file status is lost and released.

Meanwhile, the hot file selection threshold value and/or the hot file release threshold value may be adaptively changed depending on situations (e.g., the current number of hot files, the number of copies of hot files, and performance and extra storage space of a storage device).

Referring to FIGS. 5 and 6 again, the hot file management unit 243 and 323 of the file management apparatus according to the present invention manages a file selected as a hot file to be separated from a file that is not selected as a hot file.

Specifically, the hot file management unit 243 and 323 increases the number of copies of a file selected as a hot file by the unit of file or chunk and/or stores the file selected as a hot file in a storage device having a relatively good performance (refer to S740 of FIG. 7), thereby improving an access path to a corresponding file so that the file can be promptly transmitted when a client requests.

Here, an example of the storage device having a relatively good performance is a Solid State Disk (SSD) or cache memory having a fast speed, and the hot file management unit 243 and 323 stores frequently inquired hot files in the high-speed SSD or cache memory and stores relatively less frequently inquired ordinary files in a low-speed hard disk or the like, thereby improving system performance by reducing network loads.

In addition, the hot file management unit 243 and 323 continuously monitors the number of files selected as a hot file, and if the number of files selected as a hot file is larger than a predetermined maximum number of hot files, the hot file management unit 243 and 323 maintains an appropriate number of hot files by changing the hot file selection threshold value and/or the hot file release threshold value. For example, if the number of files selected as a hot file is larger than the maximum number of hot files m, the hot file management unit 243 and 323 adaptively adjusts the number of hot files by changing the hot file selection threshold value to the number of inquiries on a hot file having the m-th largest number of inquiries or re-setting the hot file selection threshold value as high as a certain value, thereby maintaining system performance.

Referring to FIGS. 5 and 6, the hot file synchronization unit 244 and 324 of the file management apparatus according to the present invention copies a file selected as a hot file into at least one of the other interconnected distributed storage systems and performs hot file synchronization (refer to S840 of FIG. 8).

Specifically, the hot file synchronization unit 244 and 324 performs hot file synchronization for a plurality of distributed storage systems by copying a file selected as a hot file into a storage server of at least one of the other distributed storage systems in association with a metadata server of at least one of the other distributed storage systems. In this case, when performing the hot file synchronization, the hot file synchronization unit 244 and 324 may synchronize the file selected as a hot file by the unit of file (i.e., by transmitting the whole file) or by the unit of chunk (i.e., by transmitting a relevant chunk of a corresponding file). Accordingly, if the client connects to the second or third distributed storage system and requests a corresponding file (a hot file), the second or third distributed storage system, which receives the file from the first distributed storage system storing the original file and stores a copy file, may promptly transmit the file by performing a cache storage function.

Finally, the metadata management unit 325 and the storage device management unit 326 of FIG. 6 are constitutional components that can be further included if the file management apparatus according to the present invention is implemented as a metadata server.

Describing in short, the metadata management unit 325 creates and manages metadata of the files stored in a plurality of storage devices (or storage servers) in a distributed manner, and the storage device management unit 326 manages information on the performance and capacity of the plurality of storage devices (or storage servers).

Accordingly, the hot file management unit 323 may further efficiently manage hot files in association with the metadata management unit 325 and/or the storage device management unit 326. For example, if the storage devices are diverse in performance or sufficient in capacity, the standard for selecting a hot file is divided into two levels, and files can be managed further efficiently by storing a high-level (further frequently inquired) hot file in a further faster storage device or increasing the number of copies of the high-level hot file.

Meanwhile, the method of managing files in a distributed storage system according to the present invention may be embodied through a computer readable recording medium containing program commands for performing the operations implemented in a variety of computers. The computer readable medium may include program commands, data files, data structures and the like in a single or combined form. The recording medium may be a medium that is specially designed and configured for the present invention or a medium that is publicized and available for those skilled in the computer software art. Examples of the computer readable medium include magnetic media such as a hard disk, a floppy disk and a magnetic tape, optical media such as a CD-ROM and a DVD, magneto-optical media such as a floptical disk, and hardware devices specially configured to store and execute the program commands, such as ROM, RAM and flash memory. Examples of the program commands include high-level language codes that can be executed by a computer using an interpreter or the like, as well as machine codes such as those generated by a compiler.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A file management apparatus for managing a file in a distributed storage system in which one file is stored in a plurality of storage devices in a distributed manner, the apparatus comprising:
   a storage device;
   an inquiry frequency counting unit for counting the number of inquiries on a file requested by a client;
   a hot file selection unit for determining whether or not to select the file as a hot file based on the number of inquiries counted on the file; and
   a hot file management unit for managing the file selected as a hot file to be separated from files that are not selected as a hot file,
   wherein the hot file selection unit selects the file as a hot file if the number of inquiries counted in a certain counting period is larger than a hot file selection threshold value,
   wherein the inquiry frequency counting unit counts the number of inquiries on the file by subtracting the number of inquiries corresponding to an oldest session from the number of inquiries counted in a previous counting period and then adding the number of inquiries counted in a new session, and
   wherein a length of the oldest session is a value obtained by dividing the previous counting period by an exponentiation of two.

2. The apparatus according to claim 1, wherein the inquiry frequency counting unit counts the number of inquiries on a file using a session access flag indicating whether or not the file is inquired during a session.

3. The apparatus according to claim 2, wherein the number of inquiries corresponding to the oldest session is obtained by dividing the number of inquiries counted in the previous counting period by the number of sessions having a session access flag of 1 among sessions corresponding to the previous counting period and then multiplying a value of the session access flag of the oldest session.

4. The apparatus according to claim 1, wherein the hot file selection unit maintains a hot file status for a minimum hot file status sustaining period for the file selected as a hot file.

5. The apparatus according to claim 1, wherein the hot file selection unit releases a hot file status of the file, if the number of inquiries on the file selected as a hot file counted in a recent counting period is smaller than a hot file release threshold value.

6. The apparatus according to claim 1, wherein the hot file management unit changes the hot file selection threshold value, if the number of files selected as a hot file is larger than a predetermined maximum number of hot files.

7. The apparatus according to claim 1, wherein the hot file management unit increases the number of copies of the file selected as a hot file or stores the file selected as a hot file in a storage device.

8. The apparatus according to claim 7, wherein the hot file management unit increases the number of copies of the file selected as a hot file by a unit of file or chunk or stores the file selected as a hot file in the storage device.

9. The apparatus according to claim 1, further comprising a metadata management unit for managing metadata of the file requested by the client.

10. The apparatus according to claim 1, further comprising a storage server management unit for managing information on performance and capacity of the plurality of storage devices.

11. A distributed storage system comprising:
a plurality of storage servers for storing a file in a distributed manner; and
a metadata server for managing metadata of the file,
wherein the metadata server counts the number of inquiries on a file requested by a client, determines whether or not to select the file as a hot file, and increases the number of copies of the file selected as a hot file or stores the file selected as a hot file in a storage device,
wherein the metadata server selects the file as a hot file if the number of inquiries counted in a certain counting period is larger than a hot file selection threshold value,
the metadata server counts the number of inquiries on the file by subtracting the number of inquiries corresponding to an oldest session from the number of inquiries counted in a previous counting period and then adding the number of inquiries counted in a new session,
a length of the oldest session is a value obtained by dividing the previous counting period by an exponentiation of two.

12. The system according to claim 11, wherein the metadata server changes the hot file selection threshold value, if the number of files selected as a hot file is larger than a predetermined maximum number of hot files.

13. A file management method for managing a file in a distributed storage system in which one file is stored in a plurality of storage devices in a distributed manner, the method comprising the steps of:
counting the number of inquiries on a file requested by a client;
selecting the file as a hot file if the number of inquiries counted in a certain counting period is larger than a hot file selection threshold value; and
increasing the number of copies of the file selected as a hot file or storing the file selected as a hot file in a storage device,
wherein the number of inquiries is counted by subtracting the number of inquiries corresponding to an oldest session from the number of inquiries counted in a previous counting period and then adding the number of inquiries counted in a new session, and
wherein a length of the oldest session is a value obtained by dividing the previous counting period by an exponentiation of two.

14. The method according to claim 13, further comprising the step of: changing the hot file selection threshold value, if the number of files selected as a hot file is larger than a predetermined maximum number of hot files.

15. The method according to claim 13, further comprising the step of: releasing a hot file status of the file, if the number of inquiries on the file selected as a hot file counted in a recent counting period is smaller than a hot file release threshold value.

16. A non-transitory computer readable recording medium for recording a program which performs the file management method according to claim 13.

17. A file management apparatus for synchronizing a file in a distributed storage system in which one file is stored in a plurality of storage devices in a distributed manner, the apparatus comprising:
a storage device;
an inquiry frequency counting unit for counting the number of inquiries on a file requested by a client;
a hot file selection unit for determining whether or not to select the file as a hot file based on the number of inquiries counted on the file; and
a hot file synchronization unit for copying the file selected as a hot file into at least one of the other distributed storage systems and synchronizing the file,
wherein the hot file selection unit selects the file as a hot file if the number of inquiries counted in a certain counting period is larger than a hot file selection threshold value,
wherein the inquiry frequency counting unit counts the number of inquiries on the file by subtracting the number of inquiries corresponding to an oldest session from the number of inquiries counted in a previous counting period and then adding the number of inquiries counted in a new session, and
wherein a length of the oldest session is a value obtained by dividing the previous counting period by an exponentiation of two.

18. The apparatus according to claim 17, wherein the inquiry frequency counting unit counts the number of inquiries on a file using a session access flag indicating whether or not the file is inquired during a session.

19. The apparatus according to claim 18, wherein the number of inquiries corresponding to the oldest session is obtained by dividing the number of inquiries counted in the previous counting period by the number of sessions having a session access flag of 1 among sessions corresponding to the previous counting period and then multiplying a value of the session access flag of the oldest session.

20. The apparatus according to claim 17, wherein the hot file selection unit maintains a hot file status for a minimum hot file status sustaining period for the file selected as a hot file.

21. The apparatus according to claim 17, wherein the hot file selection unit releases hot file status of the file, if the number of inquiries on the file selected as a hot file counted in a recent counting period is smaller than a hot file release threshold value.

22. The apparatus according to claim 17, further comprising a hot file management unit for changing the hot file selection threshold value, if the number of files selected as a hot file is larger than a predetermined maximum number of hot files.

23. The apparatus according to claim 17, wherein the hot file synchronization unit synchronizes the file selected as a hot file by a unit of file or chunk.

24. A distributed storage system comprising:
 a plurality of storage servers for storing a file in a distributed manner; and
 a metadata server for managing metadata of the file,
 wherein the metadata server counts the number of inquiries on a file requested by a client, determines whether or not to select the file as a hot file, and copies the file selected as a hot file into at least one of the other distributed storage systems and synchronizes the file,
 wherein the metadata server selects the file as a hot file if the number of inquiries counted in a certain counting period is larger than a hot file selection threshold value,
 wherein the metadata server counts the number of inquiries on the file by subtracting the number of inquiries corresponding to an oldest session from the number of inquiries counted in a previous counting period and then adding the number of inquiries counted in a new session, and
 wherein a length of the oldest session is a value obtained by dividing the previous counting period by an exponentiation of two.

25. The system according to claim 24, wherein the metadata server synchronizes the file selected as a hot file by a unit of file or chunk.

26. The system according to claim 24, wherein the metadata server changes the hot file selection threshold value, if the number of files selected as a hot file is larger than a predetermined maximum number of hot files.

27. A file management method for synchronizing a file in a distributed storage system in which one file is stored in a plurality of storage devices in a distributed manner, the method comprising the steps of:
 counting the number of inquiries on a file requested by a client;
 selecting the file as a hot file if the number of inquiries counted in a certain counting period is larger than a hot file selection threshold value; and
 copying the file selected as a hot file into at least one of the other distributed storage systems and synchronizing the file,
 wherein the number of inquiries is counted by subtracting the number of inquiries corresponding to an oldest session from the number of inquiries counted in a previous counting period and then adding the number of inquiries counted in a new session, and
 wherein a length of the oldest session is a value obtained by dividing the previous counting period by an exponentiation of two.

28. The method according to claim 27, further comprising the step of: changing the hot file selection threshold value, if the number of files selected as a hot file is larger than a predetermined maximum number of hot files.

29. The method according to claim 27, further comprising the step of: releasing hot file status of the file, if the number of inquiries on the file selected as a hot file counted in a recent counting period is smaller than a hot file release threshold value.

30. A non-transitory computer readable recording medium for recording a program which performs the file management method according to claim 27.

\* \* \* \* \*